United States Patent [19]
Fernsler

[11] Patent Number: 5,925,991
[45] Date of Patent: Jul. 20, 1999

[54] ELECTRON BEAM FOCUS VOLTAGE CIRCUIT

[75] Inventor: Ronald Eugene Fernsler, Indianapolis, Ind.

[73] Assignee: Thomson Consumer Electronics, Inc., Indianapolis, Ind.

[21] Appl. No.: 08/749,705

[22] Filed: Nov. 15, 1996

[51] Int. Cl.$^6$ .................................................... G09G 1/04
[52] U.S. Cl. ........................................... 315/382; 315/408
[58] Field of Search ................................. 315/382, 382.1, 315/368.21, 368.22, 408, 387, 389, 399; 348/806

[56] References Cited

U.S. PATENT DOCUMENTS

| | | | |
|---|---|---|---|
| 2,548,791 | 4/1951 | Hoglund et al. | 315/31 |
| 4,223,251 | 9/1980 | Haferl | 315/370 |
| 4,536,684 | 8/1985 | Babcock | 315/411 |
| 4,588,929 | 5/1986 | Wedam et al. | 315/395 |
| 5,155,417 | 10/1992 | Tateishi | 315/371 |
| 5,315,216 | 5/1994 | Van Den Herik | 315/370 |
| 5,332,953 | 7/1994 | Hartman et al. | 315/382 |

FOREIGN PATENT DOCUMENTS

| | | | |
|---|---|---|---|
| 0 549 044 A1 | 6/1993 | European Pat. Off. | H04N 3/233 |
| 63-208371 | 8/1988 | Japan | H04N 3/26 |
| 3-159417 | 7/1991 | Japan | H03K 4/04 |

OTHER PUBLICATIONS

PCT International Search Report for international counterpart application No. PCT/US 97/ 20249.

Service Manual for Nokia brand color monitor, chassis 445M/X, pp. 14 and 15, published in Finland in Nov., 1993.

*Primary Examiner*—Edward P. Westin
*Assistant Examiner*—Shane R. Gardner
*Attorney, Agent, or Firm*—Joseph S. Tripoli; Joseph J. Laks; Sammy S. Henig

[57] ABSTRACT

There is provided a circuit and method for generating a focus voltage having a predetermined waveform and magnitude for application to an electron beam focus means of a cathode ray tube having a display surface. A horizontal deflection current having a predetermined waveform and a frequency which is selectable over a predetermined range of frequencies is used to generate substantially horizontal scan lines on the display surface of the cathode ray tube by causing at least one electron beam to sweep across the display surface. The circuit has an input for receiving a signal having a current waveform representative of the waveform and frequency of the horizontal deflection current. In response to the received signal, the circuit produces a focus voltage output, the waveform and magnitude of which remain substantially constant over the range of selected frequencies of the horizontal deflection current.

23 Claims, 4 Drawing Sheets

ELECTRON BEAM FOCUS VOLTAGE CIRCUIT

BACKGROUND OF THE INVENTION

1. Field of the Invention

The present invention relates to video monitors and, in particular, to circuits for generating an electron beam focus voltage.

2. Description of the Related Art

Cathode ray tubes (CRTs) typically utilize CRT focus means to focus the electron beam to minimize distortion and other artifacts.

Such focus means adjust the focus of the electron beam with an electrical field, in accordance with a control voltage applied to the focus means by focus circuitry. The electron beam is typically focused by the focus means before being deflected by the horizontal and vertical yoke deflection coils.

Distortion addressed by the focus means is caused, for example, by changes in the deflection angle of the electron beam of the CRT as horizontal scan lines are swept across the CRT face or screen. Thus, for example, the deflection angle in the four corners of a rectangular monitor are different from the deflection angles on horizontal scan lines displayed on the center of the monitor. Such changing deflection angles cause variations in the focus of the electron beam, in part because the CRT face is roughly planar and rectangular, rather than spherical.

Various forms of focusing circuits have been developed to help change the focus of the electron beam at different horizontal and vertical points during the displaying of a frame or field, to reduce the effects of these and other variations on the focus of the electron beam. Such circuits are typically optimized for a given horizontal scanning frequency. For example, in the NTSC system, one focusing circuit may be optimized for the "1H" scan frequency of approximately 15,734 Hz. Another circuit may be optimized for the "2H" scan frequency of approximately 31,468 Hz. However, it may be desirable to utilize variable-frequency monitors, in which the horizontal scanning frequency of the monitor is dynamically switched to one of a plurality of optional horizontal scanning frequencies. Since prior art focusing circuits are typically optimized for use at a given horizontal scanning frequency, switching to other horizontal scanning frequencies will result in a degradation of electron beam focus.

One possible approach to implementing a suitable focusing circuit for use with multiple horizontal scanning frequencies involves multiple capacitances that can be switched into and out of the focusing circuit as a function of the horizontal switching frequency. This approach is undesirable in practice because it adds complexity to the focusing circuit. Furthermore, capacitors in the focusing circuit typically may be charged to voltages that are equal to approximately 1,000 V. Switching voltages of this magnitude into and out of the focusing circuit is also undesirable.

SUMMARY OF THE INVENTION

A horizontal deflection current having a predetermined waveform and a frequency which is selectable over a range of frequencies is used to generate substantially horizontal scan lines on the display surface of the cathode ray tube by causing at least one electron beam to sweep across the display surface. According to the inventive arrangements described herein, a circuit for generating a focus voltage for application to an electron beam focus means of a cathode ray tube has an input for receiving a signal having a current waveform representative of the waveform and frequency of the horizontal deflection current. The circuit conducts a portion of the signal current as a function of the frequency of the horizontal deflection current, thereby advantageously maintaining the waveform and magnitude of the focus voltage output substantially constant over the range of selected frequencies of the horizontal deflection current while simultaneously avoiding the complexity and disadvantages associated with switching capacitance into and out of the circuit.

Such a circuit comprises: an input for receiving a signal having a current waveform representative of the waveform and frequency of the horizontal deflection current; and, means, responsive to the received signal, for producing a focus voltage output having a waveform and a magnitude which remain substantially constant over the range of frequencies of the horizontal deflection current.

The means for producing a focus voltage output may comprise a variable impedance circuit having an impedance which is selectable in accordance with each selected frequency of the horizontal deflection current. The variable impedance circuit may comprise: series-connected first and second capacitors coupled to the input; and, means for selectively shunting at least a portion of current flowing through the first capacitor away from the second capacitor.

The means for selectively shunting may be operative in response to an applied frequency select signal, and may comprise a switch, the switch operative in response to the frequency select signal. The means for selectively shunting additionally may comprise a resistor coupled between the junction of the first and second capacitors and a current return path through the switch. The means for selectively shunting also may comprise at least a second resistor coupled between the junction of the first and second capacitors and the current return path through at least a second switch, the switches operative in response to at least two frequency select signals.

The variable impedance circuit may comprise: series-connected first and second capacitors coupled to the input; and, means for selectively shunting at least a portion of the signal current away from the series-connected first and second capacitors. The means for selectively shunting may comprise means for continuous variation of the magnitude of the current shunted away from the series-connected first and second capacitors in response to continuous variation of the frequency of the horizontal deflection current.

According to a feature of the inventive arrangements described herein, the circuit comprises: an input for receiving a signal having a current waveform representative of the waveform and frequency of the horizontal deflection current waveform; a capacitance coupled to the input; and, means for selectively shunting at least a portion of current away from the capacitance; whereby the waveform and magnitude of the focus voltage waveform remain substantially constant over the range of selected frequencies of the horizontal deflection current. The capacitance may comprise series-connected first and second capacitors.

The means for selectively shunting may be operative in response to an applied frequency select signal. The means for selectively shunting may comprise a switch, the switch operative in response to the frequency select signal. The shunting means additionally may comprise a resistor coupled between the junction of the first and second capacitors and a current return path through the switch.

The means for selectively shunting may comprise means for continuous variation of the magnitude of the current shunted away from the capacitance in response to continuous variation of the frequency of the horizontal deflection current. The means for continuous variation may comprise: an amplifier circuit for providing a control voltage responsive to the focus voltage across the capacitance; and, an active device responsive to the control voltage for shunting the current away from the capacitance in accordance with the continuous variation of the frequency of the horizontal deflection current. The active device may comprise a transistor.

DETAILED DESCRIPTION OF THE PREFERRED EMBODIMENT

Figure 1:
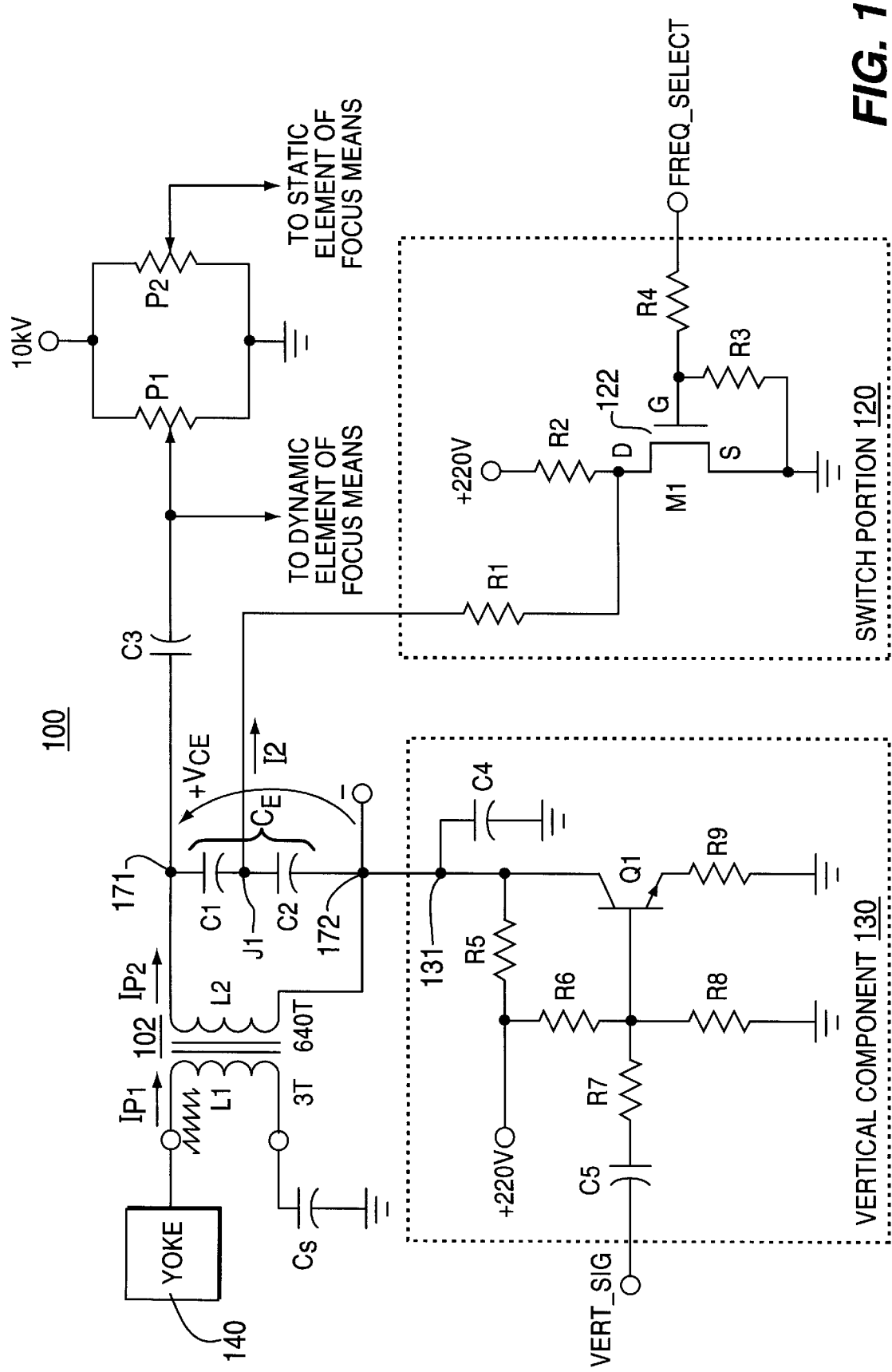
FIG. 1 is a schematic diagram of a dynamic focus circuit in accordance with the present invention.

Referring now to FIG. 1, there is shown a schematic diagram of a dynamic focus circuit in accordance with the present invention, generally designated 100. Circuit 100 includes a current transformer 102 having primary winding or coil $L_1$ and secondary winding or coil $L_2$. In one embodiment, coils $L_1$ and $L_2$ have a turns ratio of 3T to 640T. Horizontal yoke 140 of a CRT (not shown) is coupled in series with coil $L_1$. The other terminal of coil $L_1$ is coupled to ground through capacitor $C_S$. Capacitors $C_1$ and $C_2$, which combine to form an equivalent capacitance $C_E$, are coupled in series across coil $L_2$. Coil $L_2$ is coupled at one end through capacitor $C_3$ to the wiper lead of potentiometer $P_1$ and to a dynamic element of a focus means (not shown) of the CRT. Potentiometer $P_1$ is connected in parallel with potentiometer $P_2$, and each is further coupled between a 10 KV voltage source and ground. The wiper lead from potentiometer $P_2$ is coupled to a static element of the focus means.

The focus means (not shown) is a device that varies an electrical field applied to the electron beam in accordance with variations in focus voltages applied to the static and dynamic elements of the focus means. This varying electrical field adjusts the focus of the electron beam as the beam is being deflected by the yoke coils of the CRT. The voltage $V_{CE}$ across the equivalent capacitance $C_E$ is the focus voltage applied to the dynamic element of the focus means. As the focus voltage $V_{CE}$ changes, the electric field generated by the dynamic element of the focus means changes, thereby changing the focus of the electron beam. Potentiometers $P_1$ and $P_2$ are used to adjust the overall focus applied to the electron beam and the resulting picture displayed on the CRT face.

A switch portion 120 of circuit 100 includes a switch 122. In the embodiment depicted in FIG. 1, the switch is a field-effect transistor $M_1$ having a source terminal S, a drain terminal D, and a gate terminal G. The junction of capacitors $C_1$ and $C_2$ is coupled to the drain terminal D of field-effect transistor $M_1$ of switch portion 120 through resistor $R_1$. The drain terminal D of transistor $M_1$ is further coupled to a 220 V power supply through resistor $R_2$. The source terminal S of transistor $M_1$ is coupled to ground, and the gate terminal G of transistor $M_1$ is coupled to ground through resistor $R_3$. A frequency select signal FREQ_SELECT is coupled to the gate terminal G of transistor $M_1$ through resistor $R_4$. The frequency select signal FREQ_SELECT may be generated in a conventional manner which is not described herein. Transistor $M_1$ of switch portion 120 functions as a switching element of the current path from the junction J1 of capacitors $C_1$ and $C_2$ through resistor $R_1$ to ground, under control of the frequency select signal.

Circuit 100 further comprises vertical component portion 130, which provides a DC voltage, the magnitude of which varies parabolically depending upon the vertical position of the current scan line. This DC voltage is added to the parabolic focus voltage waveforms used for each scan line displayed on the CRT face. This causes the magnitude of the parabolic focus voltage waveform for each scan line to vary in accordance with the scan line's vertical distance from center, as described below with reference to FIG. 4.

The vertical component portion 130 of circuit 100 comprises a resistor $R_5$ connected in series with a capacitor $C_4$. The other terminal of capacitor $C_4$ is coupled to ground. The junction of resistor $R_5$ and capacitor $C_4$ at node 131 is coupled to the junction of coil $L_2$ and capacitor $C_2$ at node 172, as well as to the collector of a transistor $Q_1$. The other terminal of resistor $R_5$ is coupled to the 220 V power supply and one terminal of a resistor $R_6$. An input parabolic vertical signal VERT_SIG is coupled to the base of transistor $Q_1$ through capacitor $C_5$ and resistor $R_7$. The parabolic vertical signal VERT_SIG may be generated in a conventional manner which is not described herein. The emitter of transistor $Q_1$ is coupled to ground through resistor $R_9$. The other terminal of resistor $R_6$ is coupled to the base of transistor $Q_1$. A resistor $R_8$ is coupled between the base of transistor $Q_1$ and ground. The parabolically varying DC voltage provided at the VERT_SIG terminal of vertical component portion 130 has a period equal to the time required to display an entire field of scan lines, and has a peak-to-peak voltage of 5 V. Vertical component portion 130 amplifies this voltage to provide a corresponding parabolically varying DC voltage at node 131 which has a peak-to-peak voltage of 200 V.

Vertical component portion 130 thus provides a means for adding a DC voltage to the parabolic voltage waveform for each scan line, wherein the magnitude of the DC voltage varies parabolically depending upon the vertical position on the display surface of each scan line. This means for adding a DC voltage includes (1) an input terminal at a terminal of capacitor $C_5$ for receiving input vertical signal VERT_SIG, which has a parabolically varying voltage and a period which is substantially equal to the time required to display an entire field of scan lines; (2) an output terminal at node 131 coupled to the input of the focus voltage generating circuit at node 172; and (3) an amplifier, having an input coupled to the input terminal and an output coupled to the output terminal, for amplifying the input vertical signal VERT_SIG.

In one embodiment, components of circuit 100 have the following values: $L_1$=4.18 $\mu$H ($\mu$Henries), $L_2$=190 mH; $C_1$=560 pF; $C_2$=560 pF; $R_1$=2.4 K$\Omega$; $R_2$=100 K$\Omega$; $R_3$=22 K$\Omega$; and $R_4$=2.2 K$\Omega$. Yoke 140 also has an effective inductance of approximately 250–300 $\mu$H. Transistor $Q_1$ is an npn transistor of type MPSW42, and transistor $M_1$ is a FET of type IRF731. Potentiometers $P_1$ and $P_2$, in one embodiment, each have a resistance of approximately 100 Meg$\Omega$.

Yoke 140 comprises horizontal deflection coils that cause the electron beam to travel horizontally across the CRT face during the display of a scan line. Horizontal deflection coils operate by modulating an electrical field through which an electron beam passes to change the deflection angle of the beam. The horizontal deflection coils of yoke 140 receive a roughly linearly increasing, or ramping, current for each scan line, which causes the electron beam to sweep across the CRT face. Thus, the current waveform has a sawtooth shape. For a system in which there are 525 scan lines per field, for example, the current waveform applied to the horizontal deflection coils of yoke 140 includes one ramp per scan line, or 525 sawtooth wave peaks per field. Capacitor $C_S$, sometimes referred to as an "S-shaping" capacitor, is designed to modify the shape of the current ramps of the current waveform so that they have a slight "S" shape rather than being purely linearly-increasing ramps.

Horizontal deflection current $I_{P1}$, having a sawtooth shaped current waveform, is applied to the primary winding coil $L_1$ of transformer 102. In response, secondary winding coil $L_2$ of transformer 102 generates current $I_{P2}$, which is a signal having a current waveform representative of the waveform and frequency of horizontal deflection current $I_{P1}$. The equivalent capacitance $C_E$, coupled across the secondary winding coil $L_2$, integrates the sawtooth wave shaped current ramps of current $I_{P1}$ to provide a series of high-voltage parabolas, one for each ramp of current $I_{P1}$, in accordance with the equation $V=1/C\int I\,dt$. Such a parabolic shaped voltage is useful in adjusting the focus of the electron beam to address the above-described focus problems caused by changes in deflection angle.

In the present invention, the focus voltage $V_{CE}$ applied to the focus means of the CRT is varied parabolically within each scan line to keep the electron beam focused as the deflection angle changes. In one embodiment, the peak-to-peak voltage of the voltage parabola applied to the focus means for each scan line is the same, and the DC component of each voltage parabola varies for each scan line according to the scan line's vertical placement on the CRT face. This DC component itself varies parabolically along the vertical axis of the CRT face, and is supplied by vertical component portion 130, as previously described. The reason for changing the voltage parabola for each scan line is that scan lines off vertical center have different deflection angles.

Figure 2:
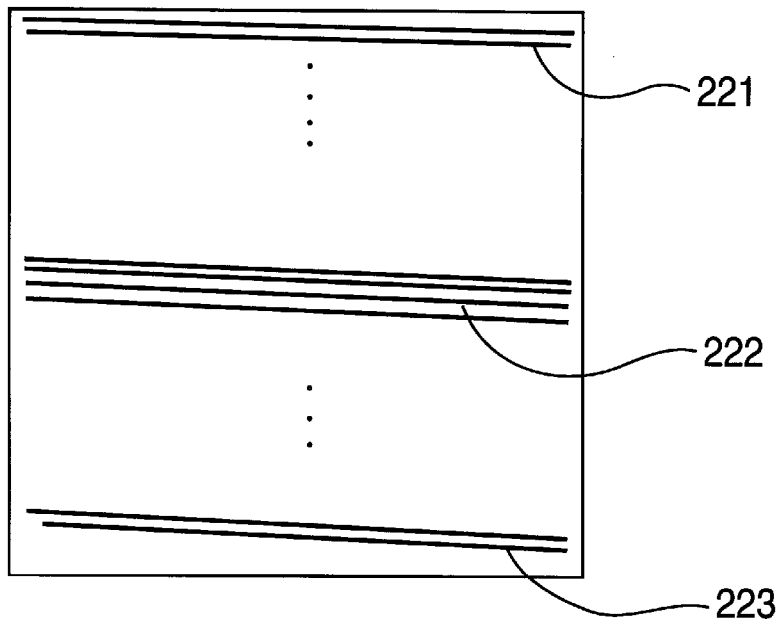
FIG. 2 depicts selected scan lines on a CRT face.

Referring now to FIG. 2, there are depicted selected scan lines on CRT face 200, including scan lines 221, 222 and 223. Scan lines 221 and 223 are top and bottom scan lines, respectively, and are approximately equidistant from center scan line 222. Because the deflection angles are greater for scan lines 221 and 223 than for scan line 222, a greater amount of voltage $V_{CE}$ is required for focusing scan lines 221 and 223 than is required for scan line 222. Further, for each of scan lines 221, 222 and 223, the left and right edges require a greater amount of focus voltage $V_{CE}$ than is required at the horizontal center of the respective scan line, since the deflection angle is greater the further that yoke 140 deflects the electron beam away from the horizontal center.

Figure 3:
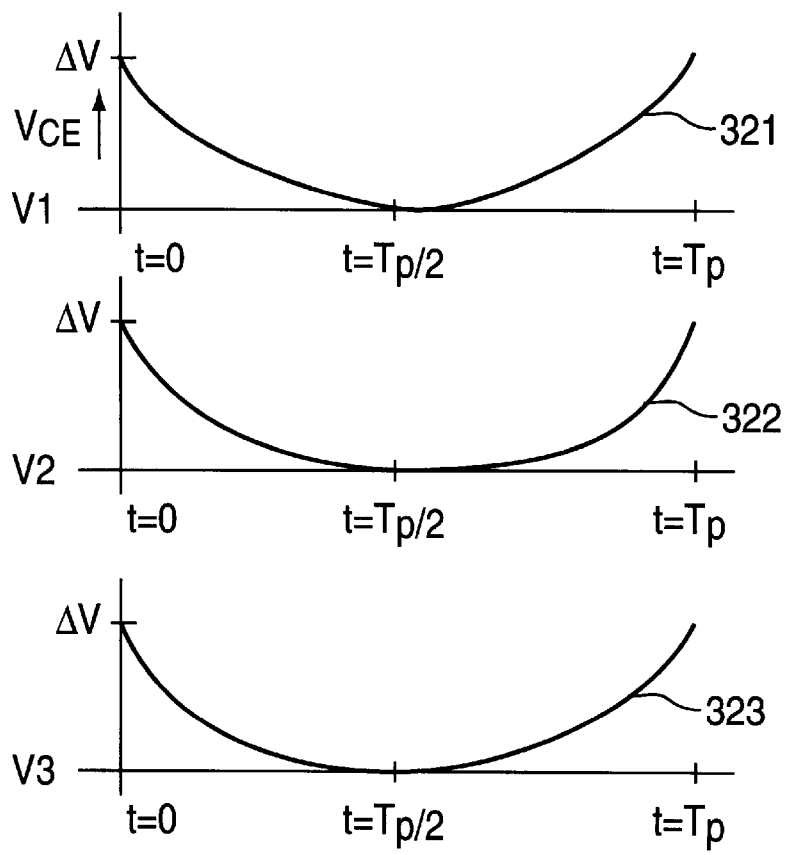
FIG. 3 depicts parabolic focus voltage waveforms for focusing selected scan lines on the CRT face illustrated in FIG. 2.

Referring now to FIGS. 3(*a*)–(*c*), there are respectively depicted parabolic focus voltage waveforms 321, 322 and 323 having DC components $V_1$, $V_2$ and $V_3$, respectively, for focusing scan lines 221, 222 and 223 on CRT face 200 of FIG. 2. These voltage waveforms show changes $\Delta$. in focus voltage $V_{CE}$ over a period of time for a single scan line, from t=0 to t=$T_P$, where $T_P$ is the period of one scan line. As illustrated in focus voltage waveform 322, a greater amount of focus voltage is applied to the focus means at the beginning and end of scan line 222. Focus voltage waveforms 321 and 323 vary similarly, but have a larger DC component (supplied by vertical component portion 130), since scan lines 221 and 223 require greater focus, due to the greater deflection angle associated with these scan lines. Thus, DC components $V_1$ and $V_3$ of focus voltages 321 and 323, respectively, are approximately equal and are both greater than the DC component $V_2$ of focus voltage 322.

Figure 4:
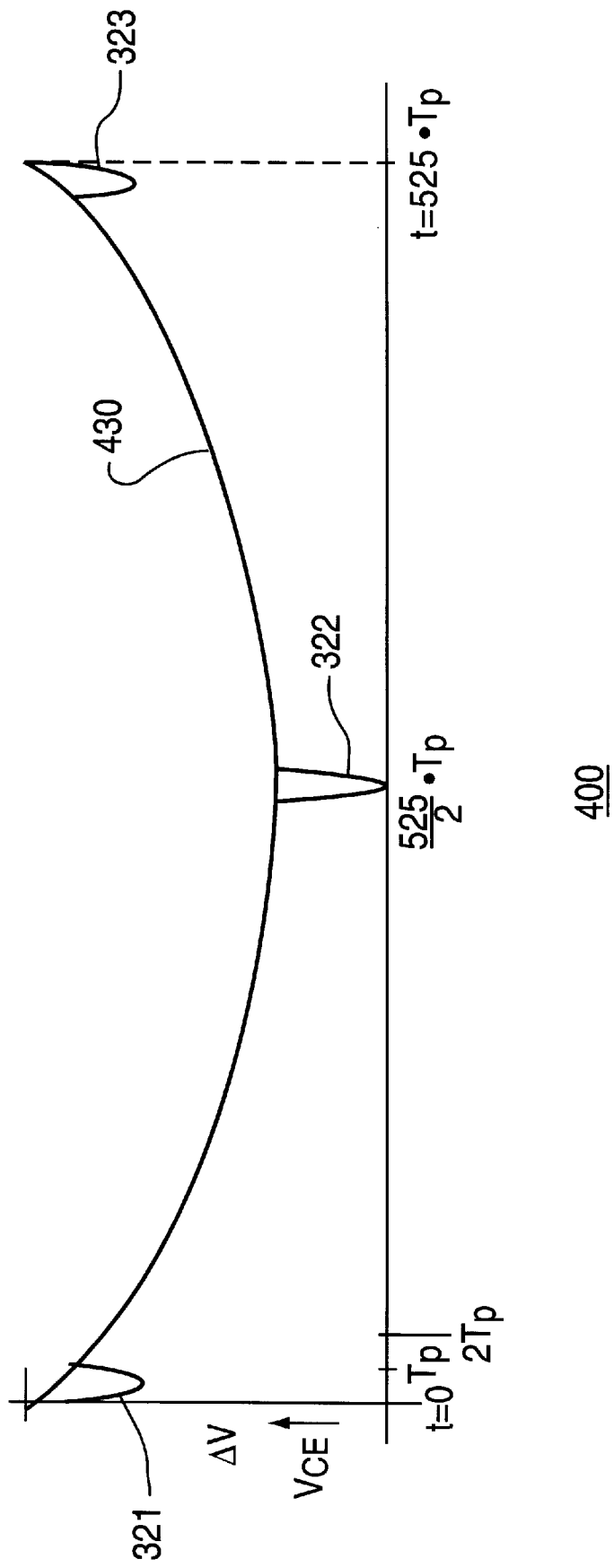
FIG. 4 depicts a parabolic DC component with the parabolic focus voltage waveforms of FIG. 3 superimposed thereon in time sequence order.

Referring now to FIG. 4, there is shown a parabolic waveform of DC component 430 with the parabolic focus voltage waveforms 321, 322 and 323 of FIG. 3 superimposed thereon in time sequence order. One parabolic focus voltage waveform is generated for each scan line per field displayed on the CRT face. The DC component of each voltage waveform itself varies parabolically, in accordance with parabolic envelope 430, which corresponds to the DC voltage generated by vertical component portion 130. This causes the parabolic voltage waveform for each scan line to have a different magnitude of the DC component in accordance with the scan line's vertical distance from center.

Different horizontal scanning frequencies can cause the focus voltage $V_{CE}$ waveforms to change. For example, suppose the horizontal scanning frequency changes from 2 H, or approximately 31,468 Hz, to 2.4 H, or approximately 37,762 Hz. In order to maintain the same scan line length, current $I_{P1}$ is maintained at the same magnitude even when the horizontal scanning frequency changes. The peak-to-peak amplitude of the yoke current, $I_{P1}$, illustrated as flowing into coil $L_1$ in FIG. 1, causes an induced peak-to-peak current $I_{P2}$ in coil $L_2$. The instantaneous current in coil $L_2$ corresponding to $I_{P2}$ is equal to $[I_{P2}t/(T_P/2)]-I_{P2}$. In accordance with the equation $V=1/C\int I\,dt$, the focus voltage corresponding to the instantaneous current in coil $L_2$ equals $(I_{P2}/C_E).(t^2/T_P-t)$, which has a parabolic waveform. Thus, if the horizontal scanning frequency changes from 2 H to 2.4 H, for example, the horizontal scanning period $T_P$ decreases and time parameter t decreases (since it takes less time to display a scan line at higher scan rates), having the net effect that focus voltage $V_{CE}$ decreases also. Similarly, if the scanning frequency decreases, focus voltage $V_{CE}$ increases.

However, the waveform shape and peak-to-peak magnitude of focus voltage $V_{CE}$ applied to the focus means for a given scan line during the horizontal scanning period $T_P$ for that scan line ideally should not change just because the scanning frequency changes, since for a CRT face and scan lines of a given size, the same deflection angles exist and require focus correction. One way to maintain the desired peak-to-peak voltage of focus voltage $V_{CE}$ when the horizontal scanning frequency increases or decreases would be to switch in a capacitor having a lower or higher capacitance, respectively. However, high voltages on the order of 1000 volts may exist across the capacitor, making it undesirable to switch capacitors in such a situation.

In accordance with the present invention, the waveform shape and peak-to-peak voltage of focus voltage $V_{CE}$ for a given scan line is advantageously maintained when the horizontal scanning frequency increases or decreases by increasing or decreasing, respectively, the effective current $I_{P2}$ that flows through equivalent capacitance $C_E$. The effective current $I_{P2}$ that flows through equivalent capacitance $C_E$ is decreased by a predetermined amount by shunting a portion of the current $I_{P2}$ away from equivalent capacitance $C_E$ by closing the transistor switch $M_1$ at the lower scanning frequency, causing a portion $I_2$ of the current $I_{P2}$ to flow to ground through resistor $R_1$. At the higher horizontal scanning frequency, transistor switch $M_1$ is opened so that none of current $I_{P2}$ is shunted away from equivalent capacitance $C_E$. Therefore, when transistor switch $M_1$ is opened, the effective current through equivalent capacitance $C_E$ is increased, causing an increase in focus voltage $V_{CE}$. Thus, employing capacitors $C_1$ and $C_2$ to form equivalent capacitance $C_E$, combined with resistor $R_1$ and transistor switch $M_1$ allows the amount of current that is being integrated by equivalent capacitance $C_E$ to be changed so as to prevent focus voltage $V_{CE}$ from changing due to changes in scanning frequency.

According to the above description, the present invention provides a means, responsive to signal $I_{P1}$, for producing a focus voltage output $V_{CE}$ at an output node 171, the waveform and peak-to-peak magnitude of which remain substantially constant over the range of selected frequencies of the horizontal deflection current $I_{P1}$. The current $I_{P2}$, which has a current waveform representative of the waveform and frequency of the horizontal deflection current $I_{P1}$, is applied to the input nodes 171 and 172 of the variable impedance circuit. The horizontal deflection current $I_{P2}$ has a predetermined waveform and a frequency which is selectable over a predetermined range of frequencies.

The means for producing a focus voltage includes capacitors $C_1$ and $C_2$, resistor $R_1$ and transistor switch $M_1$ of switch portion 120, which form a variable impedance circuit having an impedance which is selectable in accordance with each selected frequency of the horizontal deflection current. Capacitors $C_1$ and $C_2$, and resistor $R_1$ and transistor switch $M_1$ of switch portion 120 are used to effectively change the impedance seen by current $I_{P2}$.

In particular, the impedance is changed so that the waveform and peak-to-peak magnitude of the parabolic focus voltage waveform does not change when the scan line frequency changes. Capacitor $C_1$ is coupled in series with capacitor $C_2$ across the input nodes 171 and 172. Resistor $R_1$ and transistor switch $M_1$ of switch portion 120 form a means for selectively shunting at least a portion of current flowing through the first capacitor $C_1$ away from the second capacitor $C_2$. Transistor switch $M_1$ of the means for selectively shunting is operative in response to an applied frequency select signal FREQ_SELECT.

Figure 5:
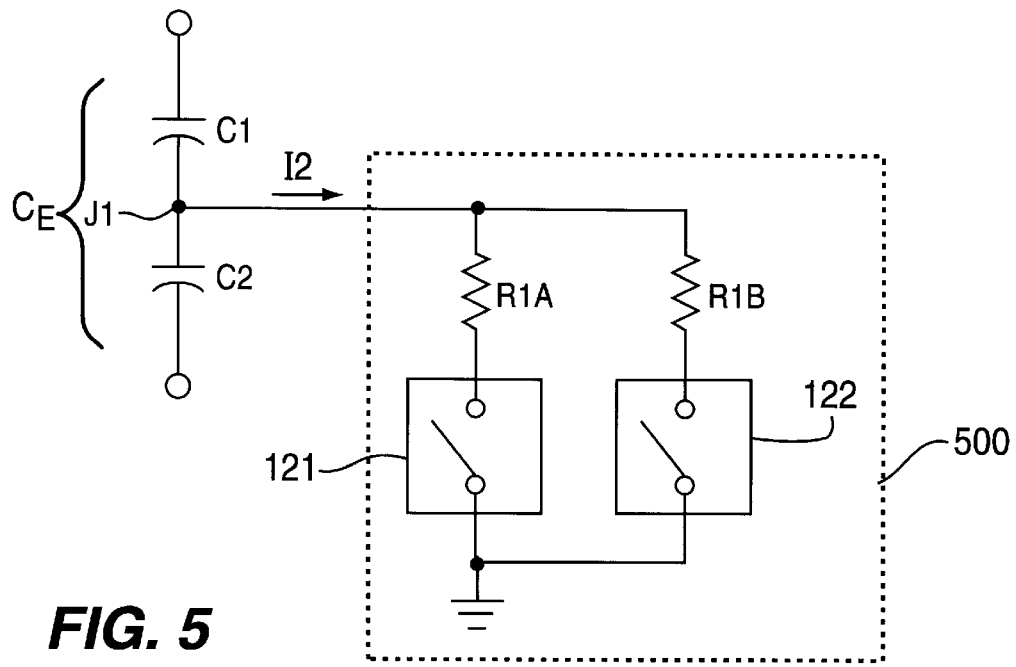
FIG. 5 is a schematic diagram of an alternative switching portion of the dynamic focus circuit of FIG. 1.

As will be appreciated, in alternative embodiments other switching and current shunting mechanisms are utilized in accordance with the present invention. Thus, in a two-capacitor embodiment such as illustrated in circuit 100, a switch such as that provided by transistor $M_1$ may be utilized to selectively couple $R_1$ to ground. Alternatively, two or more separate resistors $R_{1A}$ and $R_{1B}$, each switchable to ground and having different values, could be utilized to support up to four basic horizontal scanning frequencies. Referring now to FIG. 5, there is shown a schematic diagram of an alternative resistor and switch portion 500 of dynamic focus circuit 100 of FIG. 1. Switch portion 500 includes resistors $R_{1A}$ and $R_{1B}$, each coupled together at one end to the junction J1 of capacitors $C_1$ and $C_2$ of circuit 100. The other end of resistor $R_{1A}$ is coupled to ground through a switch 121, and the other end of resistor $R_{1B}$ is coupled to ground through a switch 122. Four scanning frequencies may be supported with resistors and switches of circuit 500 in the following configurations: (1) $R_{1A}$ open, $R_{1B}$ open (maximum current s through equivalent capacitance $C_E$ for the lowest scanning frequency); (2) $R_{1A}$ open, $R_{1B}$ closed (for the second-lowest scanning frequency, assuming $R_{1B}>R_{1A}$); (3) $R_{1A}$ closed, $R_{1B}$ open (for the second-highest scanning frequency); and (4) $R_{1A}$ closed, $R_{1B}$ closed (for the highest scanning frequency). Each scanning frequency supported by a permutation of the opened or closed positions of the plurality of switches may be selected by a plurality of frequency select signals applied to the switches. As will be appreciated, different numbers and combinations of switchable resistors and series capacitors may be utilized to adapt circuit 100 to different numbers of variable scanning frequencies. In the embodiment of FIG. 5, the means for selectively shunting described previously additionally includes a second resistor $R_{1B}$ coupled between the junction J1 of the first and second capacitors $C_1$ and $C_2$ and the current return path through a second switch 122, where both switches are operative in response to at least two frequency select signals.

Figure 6:
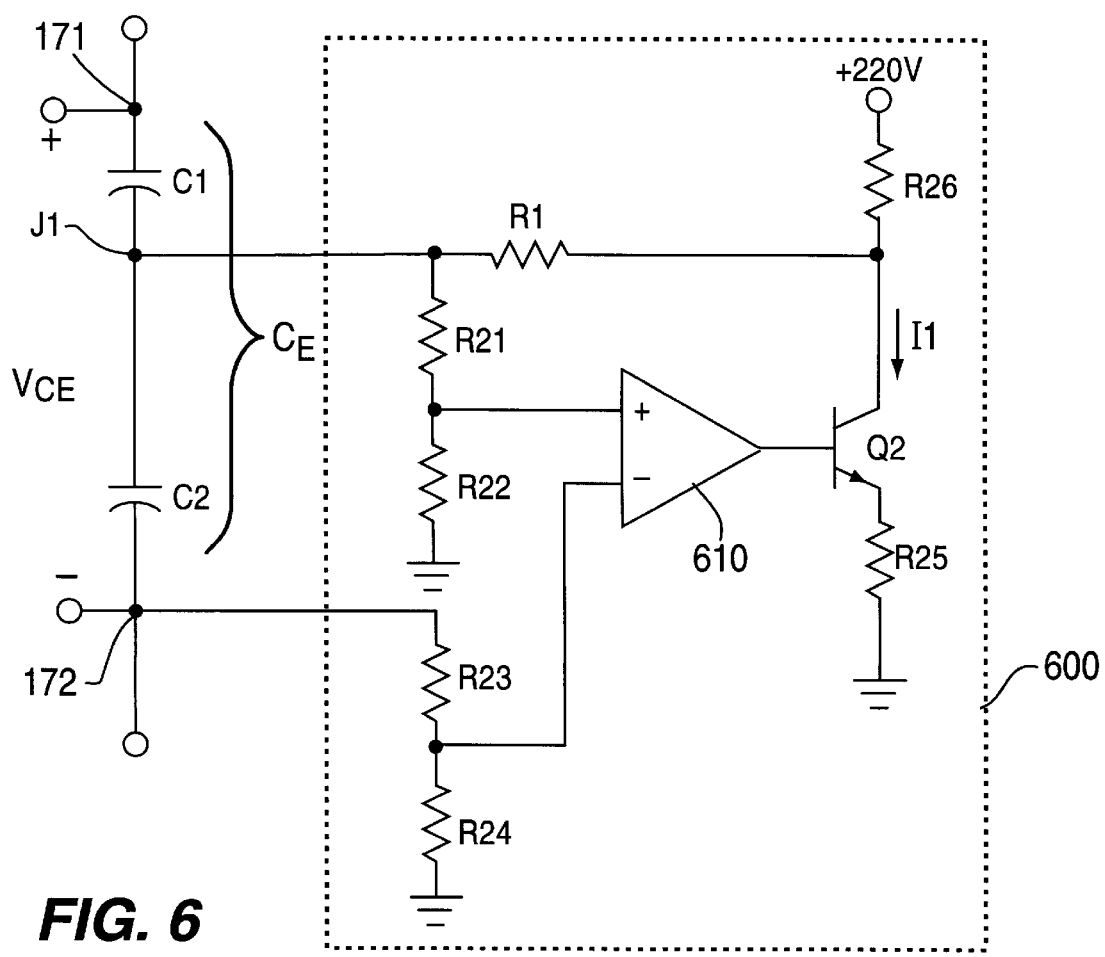
FIG. 6 is a schematic diagram of another alternative switching portion of the dynamic focus circuit of FIG. 1.

Referring now to FIG. 6, there is shown a schematic diagram of an alternative switch portion 600 of dynamic focus circuit 100 of FIG. 1, which replaces switch portion 120 of FIG. 1. Node J1 is coupled to ground through resistor $R_1$, transistor $Q_2$ and resistor $R_{25}$. Node J1 is also coupled to the non-inverting terminal of operational amplifier 610 through resistor $R_{21}$. Node 172 is coupled to the inverting input of operational amplifier 610 through resistor $R_{23}$. The non-inverting and inverting terminals of operational amplifier 610 are further coupled to ground through resistors $R_{22}$ and $R_{24}$, respectively. The collector of transistor $Q_2$ is coupled to resistor $R_1$, and also to a 220 V power supply through resistor $R_{26}$. In this alternative embodiment, operational amplifier 610 is utilized to variably control the current $I_1$ drawn through transistor $Q_2$, to allow for continuous variations in scanning frequency and dynamic adjustment of focus in accordance therewith.

For example, to provide for automatic dynamic correction, the voltage across capacitor C2 may be sensed via divided down dual inputs to an operational amplifier 610 to drive transistor $Q_2$ in a linear mode, to help resist variations in the peak-to-peak voltage range of focus voltage $V_{CE}$ that would otherwise be caused by variations in horizontal scan frequency. Transistor $Q_2$ operates in linear mode to draw a magnitude of current $I_1$ in accordance with the error signal supplied by operational amplifier 610. The combination of resistor $R_1$ and the variable resistance of transistor $Q_2$ thus forms a variable resistive impedance, controlled by the error signal from operational amplifier 610. Operational amplifier 610 and resistors $R_{21}$, $R_{22}$, $R_{23}$ and $R_{24}$ form a means for supplying an error signal to transistor $Q_2$ in accordance with variations in focus voltage $V_{CE}$, and thus a means for varying the variable resistive impedance formed by resistor $R_1$ and transistor $Q_2$. For example, the bias point of operational amplifier 610 and transistor $Q_2$ may be selected so that transistor $Q_2$ begins to conduct more current $I_1$ when the peak-to-peak focus voltage $V_{CE}$ begins to increase in response to a decrease in scan line frequency. As more current $I_1$ is conducted through transistor $Q_2$ and resistor $R_{25}$, the lower will be the focus voltage $V_{CE}$. In one embodiment, transistor $Q_2$ is an npn transistor of type MPSW42, and operational amplifier 610 is of type LF356. In the embodiment, the means for selectively shunting previously described comprises a means for continuous variation of the magnitude of the current shunted away from the equivalent capacitance $C_E$ in response to continuous variation of the frequency of the horizontal deflection current $I_{P1}$.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A circuit for generating a focus voltage for application to an electron beam focus means of a cathode ray tube, wherein a horizontal deflection current waveform has a frequency which is selectable over a range of frequencies, the circuit comprising:

means for generating a signal having a current waveform representative of the waveform and frequency of the horizontal deflection current; and, means responsive to the generated signal for producing said focus voltage, said focus voltage having a waveform and a magnitude which remain substantially constant over the range of frequencies of the horizontal deflection current;

said means for producing said focus voltage comprises a variable impedance circuit having an impedance which is selectable in accordance with each selected frequency of the horizontal deflection current;

wherein the variable impedance circuit comprises:

series-connected first and second capacitors coupled to the generating means; and, means for selectively shunting at least a portion of current flowing through the first capacitor away from the second capacitor.

2. The circuit of claim 1, wherein the means for selectively shunting is operative in response to an applied frequency select signal.

3. The circuit of claim 2, wherein the means for selectively shunting comprises a switch, the switch operative in response to the frequency select signal.

4. The circuit of claim 3, wherein the means for selectively shunting additionally comprises a resistor coupled between the junction of the first and second capacitors and a current return path through the switch.

5. The circuit of claim 4, wherein the means for selectively shunting additionally comprises at least a second resistor coupled between the junction of the first and second capacitors and the current return path through at least a second switch, the switches operative in response to at least two frequency select signals.

6. The circuit of claim 1, wherein the waveform of the focus voltage is a parabolic voltage waveform for each scan line.

7. A circuit for generating a focus voltage for application to an electron beam focus means of a cathode ray tube, wherein a horizontal deflection current waveform has a frequency which is selectable over a range of frequencies, the circuit comprising:

means for generating a signal having a current waveform representative of the waveform and frequency of the horizontal deflection current;

means responsive to the generated signal for producing said focus voltage, said focus voltage having a waveform and a magnitude which remain substantially constant over the range of frequencies of the horizontal deflection current, wherein the waveform of the focus voltage is a parabolic voltage waveform for each scan line; and means for adding a DC voltage to the parabolic voltage waveform for each scan line, wherein the magnitude of the DC voltage varies parabolically depending upon the vertical position on the display surface of each scan line.

8. The circuit of claim 7, wherein the means for adding a DC voltage comprises a vertical component circuit comprising:

an input terminal for receiving an input vertical signal having a parabolically varying voltage and a period which is substantially equal to the time required to display an entire field of scan lines;

an output terminal coupled to the input of the focus voltage generating circuit; and, an amplifier, having an input coupled to the input terminal and an output coupled to the output terminal, for amplifying the input vertical signal.

9. A circuit for generating a focus voltage waveform for a focus means of a cathode ray tube from a horizontal deflection current waveform, wherein the horizontal deflection current waveform has a frequency which is selectable over a range of frequencies, the circuit comprising:

an input for receiving a signal having a current waveform representative of the waveform and frequency of the horizontal deflection current waveform;

series-connected first and second capacitors coupled to the input; and, means for selectively shunting at least a portion of current away from the capacitors in response to an applied frequency select signal, wherein the means for selectively shunting comprises a switch, the switch operative in response to the frequency select signal and a resistor coupled between the junction of the first and second capacitors and a current return path through the switch;

wherein the waveform and magnitude of the focus voltage waveform remain substantially constant over the range of selected frequencies of the horizontal deflection current.

10. A circuit for generating a focus voltage waveform for a focus means of a cathode ray tube from a horizontal deflection current waveform, wherein the horizontal deflection current waveform has a frequency which is selectable over a range of frequencies, the circuit comprising:

an input for receiving a signal having a current waveform representative of the waveform and frequency of the horizontal deflection current waveform;

a capacitance coupled to the input; and, means for selectively shunting at least a portion of current away from the capacitance;

wherein the waveform and magnitude of the focus voltage waveform remain substantially constant over the range of selected frequencies of the horizontal deflection current;

wherein the means for selectively shunting comprises means for continuous variation of the magnitude of the current shunted away from the capacitance in response to continuous variation of the frequency of the horizontal deflection current; and wherein the means for continuous variation comprises:

an amplifier circuit for providing a control voltage responsive to the focus voltage across the capacitance; and, an active device responsive to the control voltage for shunting the current away from the capacitance in accordance with the continuous variation of the frequency of the horizontal deflection current.

11. The circuit of claim 10, wherein the active device comprises a transistor.

12. A circuit for generating a focus voltage for application to an electron beam focus means of a cathode ray tube, said circuit comprising:

means for generating a current waveform representative of the waveform and frequency of a horizontal deflection current waveform that can assume first and second frequencies;

series-connected first and second capacitors coupled to said generating means for integrating said current waveform to produce said focus voltage, said first and second capacitors forming an equivalent capacitance that does not change from said first frequency to said second frequency; and means for variably shunting at least a portion of current flowing through said first capacitor and away from said second capacitor when said horizontal deflection current waveform assumes said second frequency, said shunting means shunting current by an amount that produces a focus voltage having a waveform and a magnitude at said second frequency which remains substantially unchanged as compared to the magnitude and the waveform of said focus voltage at said first frequency.

13. The circuit of claim 12, wherein said means for variably shunting comprises a transistor acting as a variable resistance.

14. The circuit of claim 12, wherein said means for variably shunting comprises a negative feedback loop for controlling a variable impedance.

15. The circuit of claim 14, wherein said means for variably shunting comprises a transistor acting as a variable resistance and said negative feedback loop further comprises:

an amplifier circuit for amplifying a voltage representative of a voltage across said second capacitor; and an impedance coupled to said transistor and to an input of said amplifier circuit.

16. The circuit of claim 12, wherein said means for variably shunting comprises an impedance that is variable responsive to said frequency of said horizontal deflection current waveform.

17. The circuit of claim 12, wherein said generating means comprises a current transformer having deflection current flowing in a primary winding thereof and a secondary winding thereof coupled to said series-connected first and second capacitors.

18. A circuit for generating a focus voltage for a focus means of a cathode ray tube from a horizontal deflection current waveform, wherein the horizontal deflection current waveform has a frequency which is selectable over a range of frequencies, the circuit comprising:

means for receiving a current waveform representative of the waveform and frequency of said horizontal deflection current waveform;

a capacitance coupled to said receiving means for integrating said current waveform to produce said focus voltage; and, a variable resistance coupled to said capacitance for selectively shunting at least a portion of current away from said capacitance by an amount that produces a focus voltage having a waveform and a magnitude which remain substantially unchanged over the range of selected frequencies of the horizontal deflection current.

19. The circuit of claim 18, wherein said variable resistance comprises a transistor.

20. The circuit of claim 18, wherein said variable resistance comprises:

a transistor conducting responsive to a voltage representative of a voltage across said capacitance; and a resistance having a first terminal coupled to said transistor and a second terminal coupled to said capacitance.

21. The circuit of claim 18, wherein said variable resistance varies according to said range of frequencies.

22. A circuit for generating a focus voltage for a focus means of a cathode ray tube from a horizontal deflection current waveform, wherein the horizontal deflection current waveform has a frequency which is selectable over a range of frequencies, the circuit comprising:

means for generating a waveform representative of the waveform and frequency of said horizontal deflection current waveform;

a capacitance coupled to said generating means for providing said focus voltage;

means for variably shunting current from said capacitance; and an amplifier coupled in a negative feedback loop to said capacitance and to said means for variably shunting.

23. The circuit of claim 22, wherein said means for variably shunting comprises a transistor coupled to said amplifier.

\* \* \* \* \*